United States Patent
Hess

Patent Number: 6,019,556
Date of Patent: Feb. 1, 2000

[54] LOCKING FASTENER ASSEMBLY

[75] Inventor: Daniel P. Hess, Lutz, Fla.

[73] Assignee: University of South Florida, Tampa, Fla.

[21] Appl. No.: 09/220,099

[22] Filed: Dec. 23, 1998

[51] Int. Cl.[7] .............................. F16B 35/04; F16B 39/12
[52] U.S. Cl. ......................... 411/134; 411/149; 411/231; 411/432
[58] Field of Search .................................. 411/132, 149, 411/150, 231, 432, 536, 134

[56] References Cited

U.S. PATENT DOCUMENTS

| | | | |
|---|---|---|---|
| Re. 33,827 | 2/1992 | Terry | 411/149 |
| 1,746,978 | 2/1930 | Winkler | 411/536 |
| 5,474,409 | 12/1995 | Terry | 411/231 X |
| 5,522,688 | 6/1996 | Reh | 411/536 |

FOREIGN PATENT DOCUMENTS

| | | | |
|---|---|---|---|
| 853489 | 10/1970 | Canada | 411/149 |

*Primary Examiner*—Neill Wilson
*Attorney, Agent, or Firm*—Howard & Howard

[57] ABSTRACT

A locking fastener assembly comprising a fastener having a shaft (12) and a head (14 or 114) and first threads (16) for placing the shaft (12) in tension to clamp a part (18). A threaded washer (20) has second threads (22) for disposition between the head (14 or 114) and the part (18). A torsion spring (24) reacts between the head (14 or 114) and the washer (20) for urging the head (14 or 114) and the washer (20) to rotate in opposite directions. The assembly is characterized by the first and second threads (22) being of different pitches and in the same helical direction whereby the torsion spring (24) continually rotates the washer (20) to maintain a pre-load on the shaft (12). To assemble the components, the hex head (14 or 114) is first torsionally loaded against the washer (20) utilizing the torsional spring (24) such that the components would rotate apart if the pre-load was removed. The hex head (14 or 114) and washer (20) are of the same polygonal (hexagonal) shape and are rotated together with a conventional socket type wrench disposed over both at the same time. The locking fastener assembly is then tightened as the head (14 or 114) and washer (20) are rotated together or in unison to the desired torque.

9 Claims, 1 Drawing Sheet

LOCKING FASTENER ASSEMBLY

BACKGROUND OF THE INVENTION

1. Field of the Invention

The subject invention relates to a fastener assembly of the type including a threaded shaft and two threaded nuts with a spring therebetween to automatically lock onto the shaft.

2. Description of the Prior Art

A conventional fastener assembly frequently loosen under vibration and shock because the vibration and shock reduces the frictional forces between the nut and the corresponding bolt. This vibration and shock induced loosening causes expensive and time consuming maintenance and equipment failures in numerous structures and machines. In an effort to overcome this problem, assemblies have been provided which include a locking washer or second nut with the two nuts having threads extending in opposite helical directions with a spring between the nuts. Examples of such assemblies are shown in the U.S. Patents to Thalaker U.S. Pat. No. 518,165 and Green U.S. Pat. No. 581,551. However, there is a need for alternative solutions which employ different methods of manufacture which, in some cases, reduces the expense of the assembly.

SUMMARY OF THE INVENTION AND ADVANTAGES

A locking fastener assembly comprising a fastener having a shaft and a head and first threads for placing the shaft in tension to clamp a part. A threaded washer has second threads for disposition between the head and the part and a torsion spring reacts between the head and the washer for urging the head and the washer to rotate in opposite directions. The assembly is characterized by the first and second threads being of different pitches and in the same helical direction whereby the torsion spring continually rotates the washer to maintain a pre-load on the shaft.

The invention includes a method of fastening using a shaft and a head and first threads for placing the shaft in tension to clamp a part and second threads of a different pitch and in the same helical direction. The method comprises the steps of; assembling a washer in threaded engagement with the second threads and a torsion spring reacting between the head and the washer for urging the head and the washer to rotate in opposite directions, rotating the head relative to the washer to load the spring, and rotating the head and the washer in unison to place the shaft in tension with the first threads.

Accordingly, the subject invention provides a locking fastener assembly which maintains a pre-load and which is economically manufactured.

BRIEF DESCRIPTION OF THE DRAWINGS

Other advantages of the present invention will be readily appreciated as the same becomes better understood by reference to the following detailed description when considered in connection with the accompanying drawings wherein.

DESCRIPTION OF THE PREFERRED DETAILED EMBODIMENT

Figure 1:
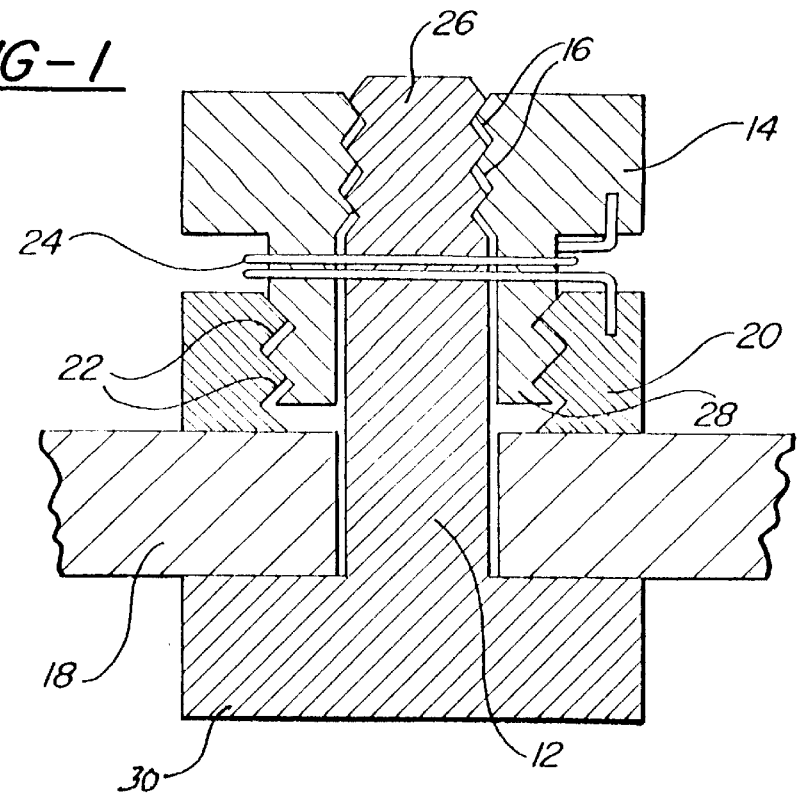
FIG. 1 is a schematic view of a first embodiment of the invention.
Figure 2:
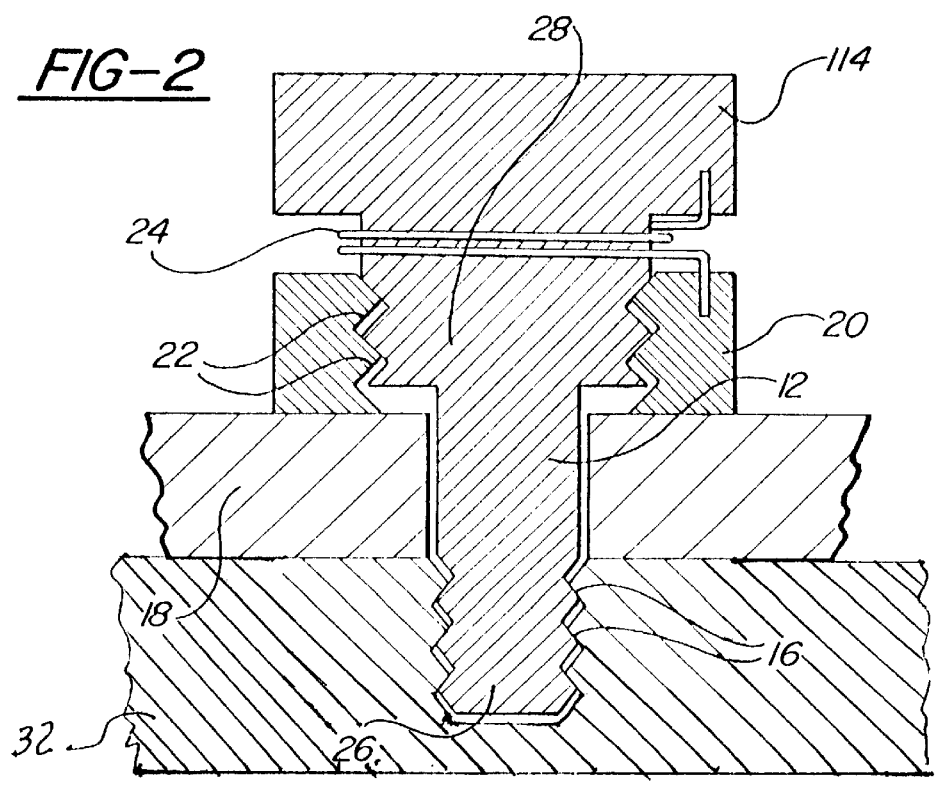
FIG. 2 is is a schematic view of a second embodiment of the invention.

Referring to the Figures, wherein like numerals indicate like or corresponding parts throughout the several views, two embodiments of a locking fastener assembly constructed in accordance with the subject invention are respectively shown in FIGS. 1 and 2.

Each locking fastener assembly includes a shaft 12 and a head 14 or 114 and first threads 16 for placing the shaft 12 in tension to clamp a part 18. a threaded washer 20 has second threads 22 for disposition between the head 14 or 114 and the part 18. a torsion spring 24 reacts between the head 14 or 114 and the washer for urging the head 14 or 114 and the washer 20 to rotate in opposite rotational directions.

The assembly is characterized by the first and second threads 22 being of different pitches and in the same helical direction whereby the torsion spring 24 continually rotates the washer 20 to maintain a pre-load on the shaft 12. As illustrated, the second threads 22 have a larger pitch than the pitch of the first threads 16. In addition, the second threads 22 have a larger pitch radius than the pitch radius of the first threads 16.

In each embodiment, the shaft 12 has a distal end 26 and the first threads 16 are disposed on that distal end 26. Also, each head 14 and 114 includes an annular shoulder 28 and the second threads 22 are disposed about that shoulder 28. The washer 20 is in threaded engagement with the shoulder 28. The torsion spring 24 is disposed about the shoulder 28 and between the washer 20 and the head 14 or 114. The first threads 16 may be standard and the second threads 22 are counter threads.

In the embodiment of FIG. 1, the head 14 threadedly engages the distal end 26 of the shaft 12 which extends from an integral head or cross member 30. In the embodiment of FIG. 2, the head 114 is integral with the shaft 12 and in axially spaced relationship to the distal end 26, the distal end 26 being threaded into a structural member 32.

The invention, therefore, provides a method of fastening using a fastener having a shaft 12 and a head 14 or 114 and first threads 16 for placing the shaft 12 in tension to clamp a part 18 and second threads 22 and 20 of a different pitch and in the same helical direction. More specifically, the method comprises the steps of; assembling a washer 20 in threaded engagement with the second threads 22 and a torsion spring 24 reacting between the head 14 or 114 and the washer 20 for urging the head 14 or 114 and the washer 20 to rotate in opposite directions, rotating the head 14 or 114 relative to the washer 20 to load the spring, and rotating the head 14 or 114 and the washer 20 in unison to place the shaft 12 in tension with the first threads 16. The head 14 or 114 has a first polygonal cross section and the washer 20 has a second polygonal cross section and both of the first and second polygonal cross sections are equal. Accordingly, separate wrenches are used to tighten the head 14 or 114 against the washer 20 to establish a predetermined pre-load, i.e., torque in the spring 24, between the washer 20 and the head 14 or 114. Once the pre-load, torsional friction between the counterthreads, is established, a single wrench which fits both of the polygonal shapes of the head 14 or 114 and washer 20, is disposed over both the head 14 or 114 and washer 20 to rotate them in unison to tighten the assembly into clamping relationship with the part 18 as the first threads 16 are tightened. The method also includes the selection of the second threads 22 with a larger pitch and pitch radius than the pitch and pitch radius of the first threads 16.

In the preferred embodiment, the spring 24 is a left wound torsion spring 24. To install the locking fastener assembly, the hex head 14 or 114 is first torsionally loaded against the washer 20 utilizing the torsional spring 24 such that the components would rotate apart if the load was removed. The hex head 14 or 114 and washer 20 are locked together with a conventional socket type wrench (not shown). The locking fastener assembly is then tightened as the head 14 or 114 and washer are rotated together or in unison to the desired torque. The socket wrench is then removed. The torsional spring 24 ensures slip between the counterthreads to thereby continuously hold the washer 20 in constant contact with the part 18 even in the absence of friction. If one attempts to loosen the locking fastener assembly without sliding a socket wrench over both the hex head 14 or 114 and the washer 20, the tightening of the washer 20 will actually increase because the counter threads 22 of the washer 20 have the lower pitch than the standard threads 16 of the hex head 14 or 114.

To remove the locking fastener assembly, the socket wrenh must slide over both the hex head 14 or 114 and the washer 20, a loosening torque can then be applied and the entire locking fastener assembly can be removed. The spring 24 ensures that loosening will not occur since the hex head 14 or 114 and washer 20 will not turn together unless a tool such as a socket wrench is used to lock the hex head 14 or 114 and washer 20 together.

It is important that the torque in the spring 24 be greater than the moment created by the counterthread friction. This is expressed by the formula:

$$T_s \geq r_{pw} W \left( \frac{\mu_{nw} \cos \lambda_w}{\cos \theta_{nw} \cos \lambda_w - \mu_{nw} \sin \lambda_w} \right)$$

wherein:
$T_s$ Magnitude of torsion spring torque;
$r_{pw}$ counter pitch radius
$W$ pre-load
$\cos \theta_n$ angle between $F_{nw}$ and x-z plane; and $F_{nw}$ normal contact force acting on hex washer thread from hex nut counter thread.
$\cos \lambda_w$ counter thread lead angle
$\mu_{nw}$ coefficient of friction between hex nut counter thread and hex washer thread
$\sin \lambda_w$ coefficient of friction between hex nut counter thread and hex washer thread The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A locking fastener assembly comprising; an axially extending shaft (12) and a head (14 or 114) and first threads (16) for placing said shaft (12) in axial tension to clamp a part (18), a threaded washer (20) having second threads (22) for disposition between said head (14 or 114) and the part (18), and a torsion spring (24) reacting between said head (14 or 114) and said washer (20) for urging said head (14 or 114) and said washer (20) to rotate in opposite directions, said assembly characterized by said first (16) and second (22) threads being of concentric and different pitches axially and in the same helical direction axially whereby the torsion spring (24) continually rotates said washer (20) to maintain a pre-load on said shaft (12).

2. An assembly as set forth in claim 1 wherein said head (14 or 114) has a first polygonal cross section and said washer (20) has a second polygonal cross section, said first and second polygonal cross sections being equal.

3. An assembly as set forth in claim 1 wherein said second threads (22) have a larger pitch than the pitch of said first threads (16).

4. An assembly as set forth in claim 3 wherein said second threads (22) have a larger pitch radius than the pitch radius of said first threads (16).

5. An assembly as set forth in claim 4 wherein said shaft (12) has a distal end (26) and said first threads (16) are disposed on said distal end (26).

6. An assembly as set forth in claim 5 wherein said head (14 or 114) includes an annular shoulder (28) and said second threads (22) are disposed about said shoulder (28), said washer (20) being in threaded engagement with said shoulder (28).

7. An assembly as set forth in claim 6 wherein said torsion spring (24) is disposed about said shoulder (28) and between said washer (20) and said head (14 or 114).

8. An assembly as set forth in claim 7 wherein said head (14) threadedly engages said distal end (26) of said shaft (12).

9. An assembly as set forth in claim 7 wherein said head (114) is integral with said shaft (12) and in axially spaced relationship to said distal end (26).

* * * * *